No. 780,307. PATENTED JAN. 17, 1905.
F. A. RYTHER.
CORD HOLDER FOR GRAIN BINDERS.
APPLICATION FILED SEPT. 17, 1904.
3 SHEETS—SHEET 1.
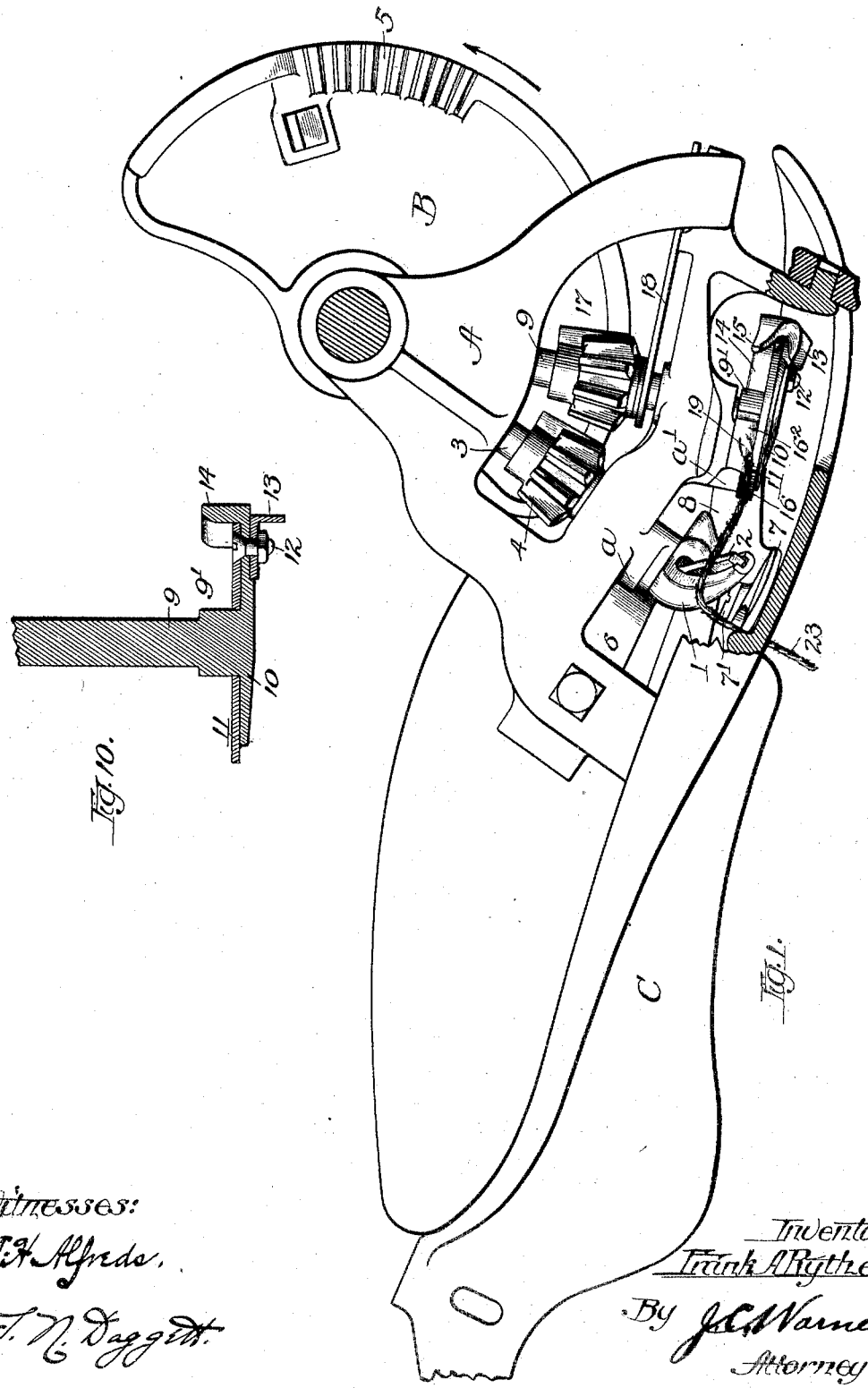

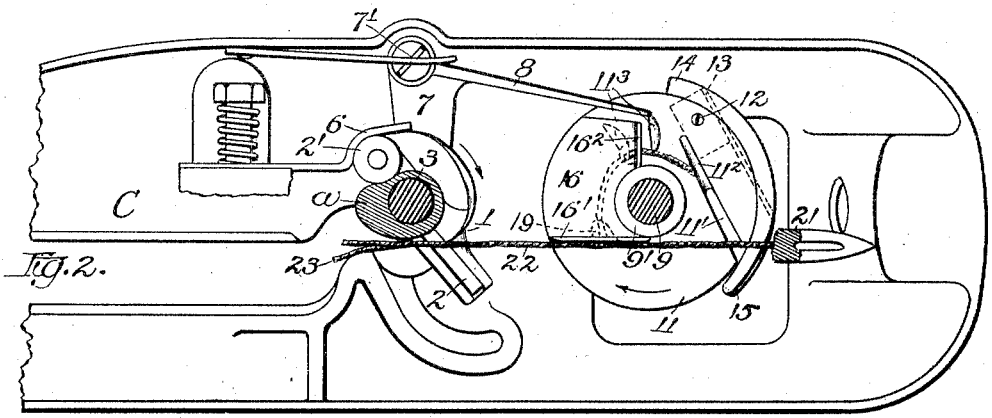
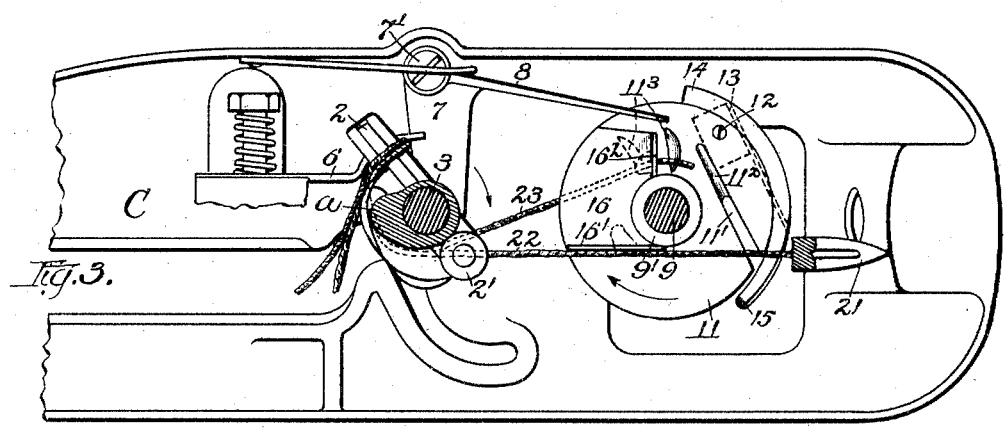
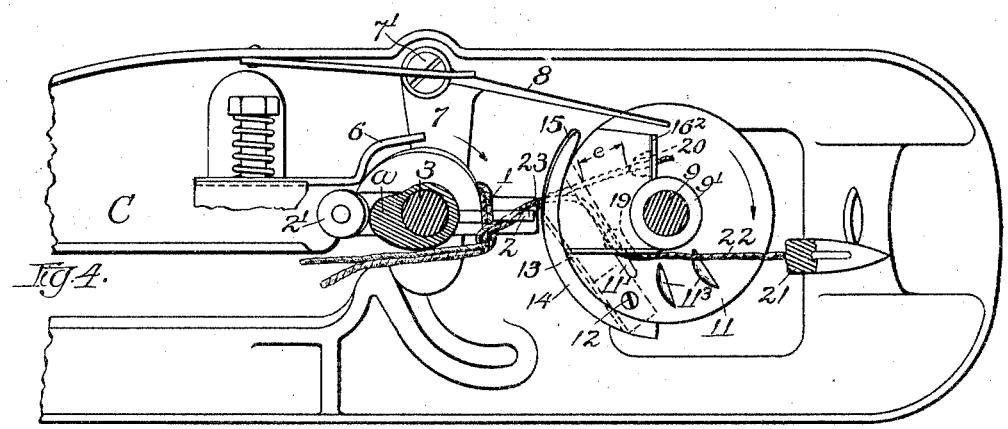

No. 780,307. PATENTED JAN. 17, 1905.
F. A. RYTHER.
CORD HOLDER FOR GRAIN BINDERS.
APPLICATION FILED SEPT. 17, 1904.
3 SHEETS—SHEET 3.
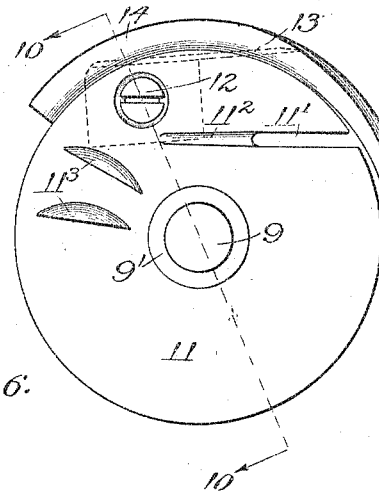
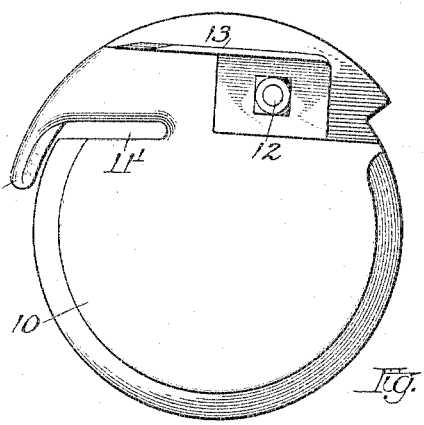
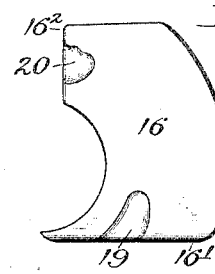
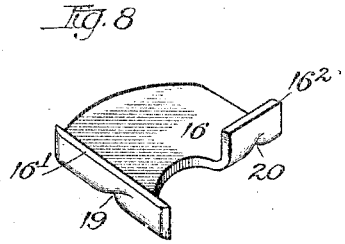
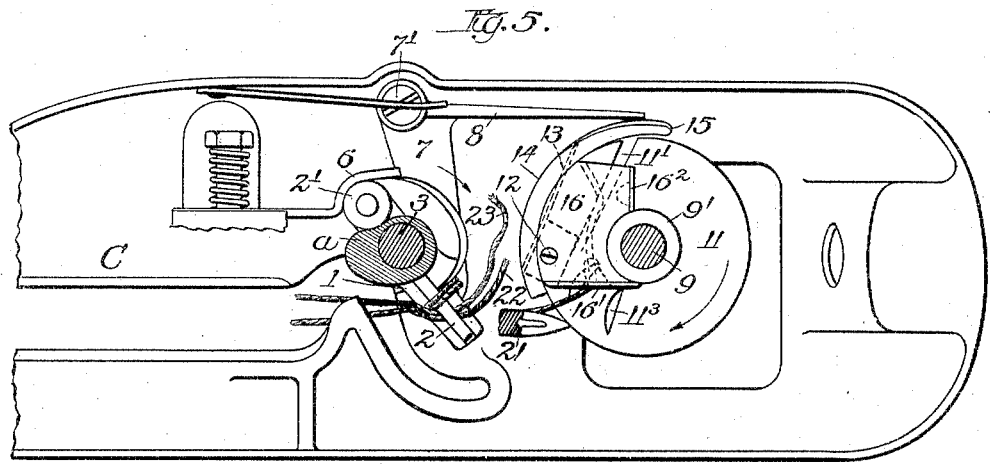
Witnesses:
J. H. Alfreds.
T. N. Daggett.
Inventor
Frank A. Ryther
By J. C. Warner,
Attorney.

No. 780,307.                                                                    Patented January 17, 1905.

UNITED STATES PATENT OFFICE.

FRANK A. RYTHER, OF CHICAGO, ILLINOIS, ASSIGNOR TO INTERNATIONAL HARVESTER COMPANY, A CORPORATION OF NEW JERSEY.

CORD-HOLDER FOR GRAIN-BINDERS.

SPECIFICATION forming part of Letters Patent No. 780,307, dated January 17, 1905.

Application filed September 17, 1904. Serial No. 224,795.

*To all whom it may concern:*

Be it known that I, FRANK A. RYTHER, a citizen of the United States, residing at Chicago, in the county of Cook and State of Illinois, have invented a new and useful Improvement in Cord-Holders for Grain-Binders, of which the following is a full specification.

This invention relates to that portion of cord-knotting devices for grain-binders which retains and severs the cord and at the proper time renders it out to the knotter-hook, the object being to so construct the cord-holder and parts that only the needle-strand of twine will be severed, thus avoiding the usual severing of the fixed end of the twine, which leaves a short end in the cord-holder, with the resulting liability to choke.

A further object of this invention consists in providing a cord-holder which will retain the twine in such a manner that the pull thereon will be substantially along a line lying within the plane of the retaining-surfaces in order to avoid drawing it about a corner or subjecting it to sharp turns. As heretofore constructed in this style of cord-holder (see Patents No. 465,610 or 661,882) both strands of twine were severed, thus leaving a short end in the disk, which would often clog or choke same, or the retaining-surfaces of the cord-holding mechanism were so made that rough surfaces or comparatively sharp turns were depended upon to effect the grip of the twine. The first-mentioned defect ultimately condemned this style of holder. Because of the attrition and mangling which result from drawing the twine between rough surfaces or about comparatively sharp corners it is very soon weakened. In fact, experience has demonstrated that when subjected to the necessary tension required in binding grain not more than about four inches can be rendered by the cord-holder until the strength becomes so impaired that breaking results, whereas with the improved form of cord-holder herein shown the twine can be drawn through indefinitely without injury to same.

Referring to the drawings, Figure 1 is a rear elevation of a cord-knotting mechanism in connection with the breastplate adjacent thereto, a portion of the knotter-frame being broken away in order to more clearly show the cord-holder and knotter-hook. Figs. 2 to 5, inclusive, are plan views of the essential parts of the cord-knotter designed to illustrate the operation of the mechanism and the successive relations of the twine thereto, Fig. 2 showing the twine and the several parts in their normal positions, but with the needle in its forward position, and Fig. 3 being a similar view, but with the knotter-hook turned substantially a half-revolution and the twine rendered out from the cord-holder to the said hook. Fig. 4 shows the cord-holder rotated until the horn thereon has engaged the needle-strand of twine, in which position the knife on the cord-holder disk is in position to sever the same, while the jaws of the knotter-hook have been opened and turned stubbleward, and in Fig. 5 the knotter-hook is in its home position, while the horn of the cord-holder has moved far enough to actuate the twine latch or gate on the breastplate. Fig. 6 represents a detail plan view of the cord-holder disk. Fig. 7 is a reverse plan of same. Fig. 8 is a detail perspective showing the upper side of the cord-holder plate. Fig. 9 is a reverse plan of same, in which is shown the extent of the two relieved surfaces on the lower or contacting side thereof; and Fig. 10 is a central transverse section taken through the cord-holder disk, as indicated by the line 10 10 in Fig. 6.

Referring to the accompanying drawings, A designates the knotter-frame, B the knotter-cam, and C the breastplate.

1 represents the lower jaw of the knotter-hook; 2, the upper jaw, pivoted therein in the usual manner; 2′, the roller mounted on the heel end of said upper jaw 2; 3, the stem of the knotter-hook, mounted radially in a suitable bearing in the knotter-frame. To the upper end of the knotter-stem 3 is rigidly secured the usual intermittent or segmental pinion 4, which is actuated by the gear-segment 5 on the knotter-cam B. The upper jaw of the knotter-hook is actuated by means of the cam $a$, formed integral with the knotter-frame A and the spring 6, as shown.

7 is a gate or latch designed to retain the twine in position, as shown in Fig. 4, until after the knot is completed. This latch is pivoted at 7' and is provided with the arm 8, which extends to and is actuated by the cord-holder disk, as set forth and claimed in Patent No. 714,242, granted to me November 25, 1902.

No novelty is claimed in the above-mentioned parts, and hence any suitable construction thereof may be adopted.

Journaled in a suitable bearing in a knotter-frame A and arranged also radially with respect to the center of the knotter-cam B is the stem 9 of the cord-holder. This stem (see Fig. 10) is preferably a malleable casting, which terminates below in a circular flange-like extension 10.

9' is an enlarged portion of the stem adjacent to the flange extension and designed to reinforce the union therebetween. Sleeved over this reinforced portion of the cord-holder stem 9 is the cord-holder disk 11, constructed, preferably, of hardened steel, and held in place by means of the small bolt 12, having a countersunk head, as shown. The bolt 12 also serves to secure to the under side of the flange extension 10 the knife 13, the cutting edge of the knife lying in a vertical plane beneath the periphery of the disk 11. (Clearly shown in Figs. 7 and 10.) On one side of the flange extension 10 is formed an upwardly-extending wall 14, which is designed to actuate the twine latch or gate 7, as hereinafter explained. Projecting forwardly from this wall with practically the same curvature is the horn or twine guide 15.

The disk 11 is provided with a slot 11', extending obliquely inward from the periphery thereof, as clearly shown in Fig. 6, the flange extension 10 being provided with a corresponding slot which registers therewith. The inner end of this slot 11' does not terminate abruptly, but ends in a groove $11^2$ of gradually-lessening depth, as shown in the same figure. The mouth of this slot is located at the periphery of the disk and immediately adjacent to the base of the horn 15, as shown in Fig. 6. The function of these parts will be explained in connection with the description of the operation of the cord-holding mechanism. The direction of rotation of the cord-holding disk, the knotter-hook, and the knotter-cam is as indicated by the arrows in the several figures. Immediately in the rear of this slot 11' and groove $11^2$, when regarded in the sense of the direction of rotation, are formed the depressions $11^3$, the object being to interrupt the smooth surface at this particular point and make the disk and not the coöperating plate above the aggressive and engaging member.

Superposed above the disk 11 is a plate 16, (see Figs. 8 and 9,) which coöperates with the above-described disk to grip the twine. This plate lies against and is held by the downward-projecting lug $a'$ on the knotter-frame A, adjacent to the bearing of the cord-holder stem 9, as shown in Fig. 1. Near the upper end of this stem 9 of the cord-holder is rigidly secured the segmental pinion 17, this pinion being also actuated by the gear-segment 5 on the knotter-cam B. The rotation of both the cord-holder and the knotter-hook by segmental pinions driven by a single gear-segment on the knotter-cam is very common and need not be further dwelt upon herein.

18 is a flat spring suitably secured to the knotter-frame, as shown in Fig. 1, having its free end slotted and made to engage the stem 9 of the cord-holder immediately beneath the segmental pinion 17. Such an arrangement of the spring will operate to exert an upward pressure on the cord-holder stem and disk, the effect of which will be to hold the disk 11 in yielding contact with the plate 16. The usual arrangement heretofore effected of this element has been to place it beneath the cord-holder disk instead of above. The extent of the contacting surface of the plate 16 is slightly more than a quarter of the disk 11, while its contour is such that it will fit between the upward-extending wall 14 of the flange extension 10 and the reinforced portion 9' of the cord-holder stem. The upturned flanges 16' and $16^2$ of the plate 16 engage the lower margin of the downward-projecting lug $a'$ of the knotter-frame, and thus effectually prevent rotation of the said plate. The under or contacting side of this plate is provided with the two relieved portions 19 and 20, located on what might be regarded as the engaging and retreating edges thereof. From an inspection of Figs. 4 and 5 it will be seen that these relieved portions 19 and 20 when in certain positions register with the inner end of the slot 11' on the disk 11 for a purpose hereinafter explained.

21 represents the point of the needle which carries the twine to the cord-holder, and 22 designates the strand of twine leading therefrom, and is hereinafter termed the "needle-twine."

23 represents the strand of twine which after being severed by the knife is gripped by the cord-holder, and will hereinafter be termed the "cord-holder" twine, it being understood, of course, that these two strands of twine form the two branches of the loop which incloses the sheaf to be bound.

The operation of the device is as follows: After a sheaf has been bound the twine will be gripped in the cord-holder, as shown in Fig. 2. The needle 21 now moves to its forward position, carrying the loop over the top of the bundle and laying the needle-strand 22 across the knotter-hook and over the top of the disk 11 and the horn 15, as shown also in the same figure. It will be seen in this figure that the cord-holder twine emerges from beneath the plate 11 at the relieved portion 19 therein, thence extending over the knotter-hook and around the bundle. The gear-segment 5 of the knotter-cam B now engages the segmental pinion 4 on the upper end of the stem 3 of the knotter-hook and rotates it to the position shown in Fig. 3. During this movement the cord-holder has remained stationary; but as the gear-segment 5 is rotated to engage the pinion on the upper end of the cord-holder stem further movement thereof will effect the initial movement of the cord-holder. In the half-revolution of the knotter-hook the necessary amount of twine is rendered thereto from the cord-holder by the cord-holder twine 23 pulling from beneath the relieved portion 19 until it lies along a straight line, as shown in Fig. 3. In the event the straightening of the twine does not render a sufficient amount the twine will be drawn between the plate 16 and the disk 11. As the needle-twine has not yet been engaged by the cord-holder, it will be drawn from there in the usual way. While the knotter-hook moves from the position shown in Fig. 3 to that shown in Fig. 4 the cord-holder will have moved to the position indicated in the latter figure. In this movement very little twine need be rendered to the knotter-hook, since practically all of the necessary amount is afforded by the strands slipping down over the heel of the lower jaw of the hook. Whatever additional amount may be required will be rendered from the cord-holder twine by the twine slipping between the plate and disk 11, as before described. In this movement the needle-twine will have been engaged by the horn 15 and dropped into the slot 11' and the groove $11^2$ at the inner end thereof. This slot and groove acting in conjunction with the relieved portion 19 on the plate 16, which during the latter part of this period of revolution are made to register with each other, will thus permit the required amount of needle-twine to be rendered through the cord-holder to the knotter-hook. During this movement the knife 13 will have moved to a position ready to sever the twine and the jaws of the knotter-hook will have opened and engaged both strands thereof, as shown. From an inspection of Fig. 4 it will be seen that continued movement from the positions therein shown will cause the relieved portion 19 on the approaching side of the plate 16 to no longer register with the slot 11', and hence the cord will be carried forward and gripped between the surfaces. Simultaneously with this result the distance $e$ between the slot 11' of the disk 11 and the relieved portion 20 in the retreating edge of the plate 16 will be quickly reduced, and it is manifest that when the slot registers with the said relieved portion the cord-holder twine will be released and free to slip therefrom. The amount of this distance is so regulated that before pressure enough exists between the knife edge and the cord-holder strand of twine to sever the latter it will be released and thrown from the cord-holder practically simultaneous with the severing of the strand of needle-twine. To effect such results requires only a comparatively small movement, but sufficient to enable the needle-strand to be firmly gripped before being severed. In this manner the relieved portion 19 on the approaching edge of the plate is thus made to constitute means which coöperates with the slot in the cord-holder disk to render twine from the needle to the knotter-hook after the twine has been engaged between the disk and plate, while the relieved portion 20 is made to constitute means which also coöperates with the slot in the disk to effect the release of the end of the cord-holder twine simultaneous with the severing and gripping of the needle-twine.

In moving from the position shown in Fig. 4 to that shown in Fig. 5 the knotter-hook will have returned to its home position and the jaws thereof closed, the knot being formed and ready to be stripped. Simultaneous with this movement of the knotter-hook the cord-holder will have turned to the position shown in this figure, in which the horn 15, acting as a cam, engages and actuates the arm 8 of the latch 7. The needle has now begun its return movement and will occupy at this stage a position nearly above the cord-holder, as shown in this figure. The end of the needle-twine which was severed (now the cord-holder twine) is engaged by the aggressive surface formed by the depressions $11^3$ on the upper face of the disk 11, and on further movement thereof is carried forward and ultimately beyond the retreating edge of the plate, as shown in Fig. 2. The cord-holder is turned practically a half-revolution after the knotter-hook stops and to its initial position, as indicated in same figure.

What I claim as my invention, and desire to secure by Letters Patent, is—

1. A cord-holder for grain-binders comprising a yieldingly-held rotatable disk provided with a slot which extends inwardly and rearward from the periphery thereof, a superposed plate having a portion of its front contacting surface relieved, the said relieved portion coöperating with said slot in the disk to render needle-twine therefrom after the same has been engaged between the disk and plate, substantially as set forth.

2. A cord-holder for grain-binders comprising a yieldingly-held rotatable disk provided with a slot which extends inwardly and rearward from the periphery thereof, a superposed plate having a portion of its rear contacting surface relieved, the said relieved portion coöperating with said slot in the disk to effect the release of the end of the cord-holder twine, substantially as set forth.

3. A cord-holder for grain-binders comprising a yieldingly-held rotatable disk provided with a slot which extends inwardly and rearward from the periphery thereof, a superposed plate having a portion of both its front and rear contacting surfaces relieved, the said relieved portion in front coöperating with said slot in the disk to render the needle-twine therefrom after it has been engaged between the disk and plate, while the said relieved portion in the rear coöperates with said slot in the disk to effect the release of the end of the cord-holder twine, the operation of the two relieved portions being successive, substantially as set forth.

4. A cord-holder for grain-binders comprising a yieldingly-held rotatable disk, a superposed plate, a guide for directing the needle-twine therebetween, means for enabling the needle-twine to be rendered from the cord-holder after it has been engaged between the disk and plate, and means operating successively with respect to the above-described means for releasing the grip on the end of the cord-holder twine, substantially as set forth.

5. A cord-holder for grain-binders comprising a yieldingly-held rotatable disk, a superposed plate, a guide for directing the needle-twine therebetween, and means for releasing the grip on the unsevered end of the cord-holder twine, substantially as set forth.

6. A cord-holder for grain-binders comprising a yieldingly-held rotatable disk provided with a stem and a slot which extends inwardly and rearwardly from the periphery of said disk, a downward-extending knife secured to said disk at the periphery thereof, the said knife and the inner end of said slot being practically in a line radial to the stem of said cord-holder disk, a superposed plate, and means for guiding the twine between said disk and plate and into said slot, substantially as set forth.

7. A cord-holder for grain-binders comprising a yieldingly-held rotatable disk provided with a slot which extends inwardly and rearward from the periphery thereof, a superposed plate having a portion of its rear contacting surface relieved, the said relieved portion coacting with said slot to release the grip on the unsevered end of the cord-holder twine, means for guiding the needle-twine between said disk and plate and into said slot, and a knife depending from the periphery of said disk, said knife operating to sever the needle-twine and to throw the released end of the unsevered cord-holder twine from said cord-holder, substantially as set forth.

FRANK A. RYTHER.

Witnesses:
  W. S. Tyson,
  O. A. Anderson.